Jan. 18, 1938.  H. R. RICARDO  2,106,124
COMBUSTION CHAMBER OF INTERNAL COMBUSTION ENGINES OF
THE COMPRESSION IGNITION TYPE
Filed Dec. 27, 1934   2 Sheets-Sheet 1

Inventor
Harry Ralph Ricardo,
By Watson, Coit, Morse and Grindle
Att'ys

Jan. 18, 1938.  H. R. RICARDO  2,106,124
COMBUSTION CHAMBER OF INTERNAL COMBUSTION ENGINES OF
THE COMPRESSION IGNITION TYPE
Filed Dec. 27, 1934   2 Sheets-Sheet 2
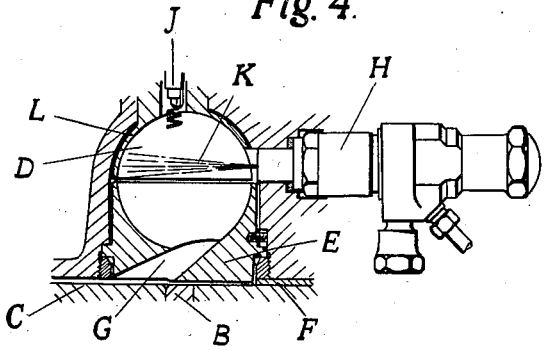
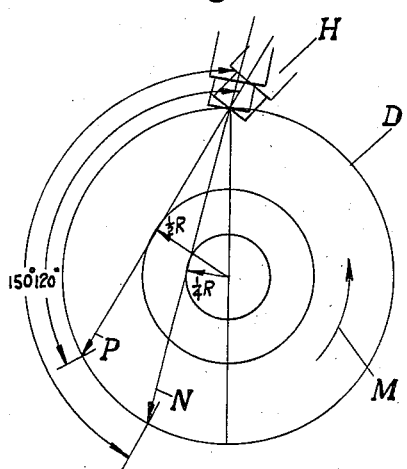
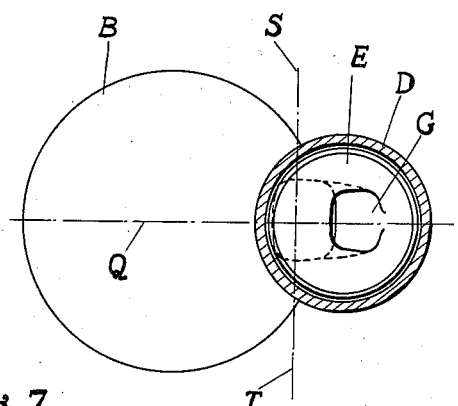
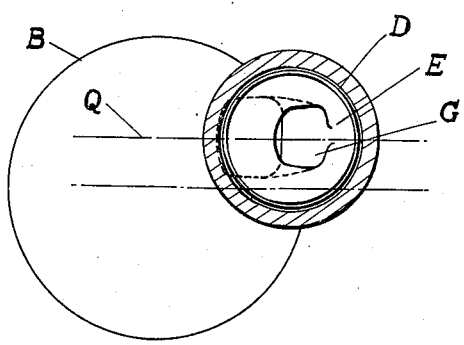
Inventor
Harry Ralph Ricardo,
By Watson, Cole, Morse and Grindle
Att'ys Patented Jan. 18, 1938

2,106,124

UNITED STATES PATENT OFFICE 2,106,124

COMBUSTION CHAMBER OF INTERNAL COMBUSTION ENGINES OF THE COMPRESSION IGNITION TYPE

Harry Ralph Ricardo, London, England

Application December 27, 1934, Serial No. 759,392
In Great Britain January 4, 1934

3 Claims. (Cl. 123—32)

This invention relates to the combustion chambers of internal combustion engines of the liquid fuel injection compression ignition type.

The invention is confined to that type of such engine in which as much as possible of the clearance space at the end of the compression stroke is comprised by a pocket and in which during the compression stroke as much as possible of the air charge is forced into the pocket which constitutes the combustion chamber through a passage-way formed in a hot member, such as a heat-insulated plug. The contour of the pocket is approximately a surface of revolution symmetrical about a plane at right angles to its axis, whilst the passage-way axis lies in the said plane but does not intersect the said axis so that the air enters the chamber more or less tangentially and partakes of a swirling motion about the axis of the chamber.

Examples of this type of engine are described in the present applicant's U. S. Patent No. 2,003,311. In the construction described in this specification the combustion chamber has a substantially spherical form and the fuel jet is directed substantially diametrically across the chamber. In other words the axis of the jet is directed towards a point angularly spaced from the injector nozzle about the axis of the chamber by an angular spacing of approximately 180°.

According to the present invention the axis of the fuel jet lies in the aforesaid plane of symmetry of the chamber containing the passage-way axis, but is directed towards a point on a hot part of the chamber wall, which point is angularly spaced from the injector nozzle about the chamber axis in the direction in which the air circulates by an angular spacing which is some degrees less than 180° but not less than approximately 120°, whilst the passage-way orifice is situated outside such angular spacing. The preferred value of the angular spacing is between approximately 120° and approximately 150°, and in any case the jet axis does not extend diametrically across the chamber.

The passage-way orifice may, for example, be angularly spaced from the injector nozzle about the chamber axis in the direction in which the air circulates by an angular spacing in the neighbourhood of from 180° to 225°, the jet axis being then directed towards a point on the hot member through which the passage-way is formed. Preferably the passage-way is angularly spaced about the chamber axis, in the direction in which the air circulates, from the point at which the jet axis is directed by an angle of less than about 90°.

The hot part of the chamber wall towards which the jet axis is directed may either be constituted by a heat-insulated plug or by a heat-insulated liner as described in the prior specifications referred to, or it may be afforded by some other suitably disposed part which is arranged so as not to be effectively cooled by water or otherwise.

Thus it will be seen that the axis of the jet lies along a chord of the circular contour of the combustion chamber. The distance of the chord from the centre of the circle is preferably between approximately a quarter and approximately a half of the radius of the circle (these limits corresponding to the limits of angular spacing mentioned above), whilst the passage-way orifice, the air approaching the injector nozzle and the chamber axis are all on the same side of the chord. That is to say, the jet is delivered tangentially with respect to a circle concentric with the contour of the combustion chamber and less than half the diameter thereof, the direction of circulation of the entering fuel being the same as the direction of circulation of the entering air.

The arrangement of the combustion chamber with reference to the cylinder may be such that the axis of the passage-way intersects that of the cylinder bore or alternatively the passage-way axis may be offset so as to pass to one side of the cylinder axis.

The axis of the fuel jet need not be coincident with the axis of the fuel injector, since the latter may be formed with a nozzle which delivers a jet laterally or obliquely. In this case the injector may be mounted so that its axis passes through the axis of the combustion chamber, although the axis of the actual jet of fuel delivered passes as above indicated to one side thereof.

Alternatively the axis of the jet of fuel delivered may coincide or substantially coincide with the axis of the injector, in which case the latter will be arranged so that its axis is tangential to a circle whose diameter is less than half that of the intersection of the combustion chamber with the aforesaid plane of symmetry.

As to the form of the combustion chamber itself this may be actually or approximately spherical or spheroidal or it may have the shape of a double concave or a double convex lens. Alternatively the combustion chamber may be cylindrical or barrel-shaped or may have the appearance of two truncated cones, whose smaller ends are in communication about the centre of the length of the chamber, which extends transversely in relation to the fuel jet axis. In any case, however, the contour of the combustion chamber is a surface of revolution and is symmetrical about a plane which is normal to its axis.

In the above described arrangement the flow of fuel from the jet will be in a general direction between the centre or axis of the combustion chamber and its periphery, the jet being delivered tangentially with respect to a circle drawn about the axis of the combustion chamber and in the same direction as that taken by the air charge after its passage through the tangential passage-way through the hot plug.

The fuel delivered into the combustion chamber in this manner will be concentrated in the path of that portion of the air circulating within the chamber which has a high linear velocity. Moreover, the fuel will be delivered where the greatest quantity of air tends to pass over or through the fuel jet at each revolution of the swirling air. The central portion of the combustion chamber in which lies the axis about which the swirling air rotates, requires the least amount of fuel to be delivered thereinto, since at that place the linear velocity of the air flow is low or almost negligible. It is also obvious that, due to friction, there will be an outer zone of relatively slowly moving air adjacent the wall of the chamber. When the fuel is injected and combustion is taking place, it is desirable that the products of combustion should be carried away from the jet and replaced by fresh air entering and circulating in the combustion chamber so as to enable efficient burning to proceed until fuel injection ceases. The position and direction of the fuel jet and the speed of rotation of the air charge are determined so that so far as practicable when the engine is on full load, the products of combustion will not be returned by the swirling air into the jet until most of the air in the combustion chamber has been burned and fuel injection has ceased.

The invention may be carried into practice in various ways but certain embodiments will be described by way of example with reference to the accompanying drawings, in which—

Figure 1 is a somewhat diagrammatic sectional elevation of part of the cylinder structure of an internal combustion engine, Figures 2, 3 and 4 are somewhat diagrammatic sectional elevations showing modified arrangements of the fuel injector, Figure 5 is a diagram indicating the angular limits of the axis of the fuel jet, Figure 6 is a diagrammatic partial plan view indicating the position of the combustion chamber with respect to the cylinder bore, and Figure 7 is a view similar to Figure 6 of an alternative arrangement.

The particular form of engine, of which a portion is shown in Figure 1, has already been described in the present applicant's patent referred to above. As shown in Figure 1, it comprises a water-cooled cylinder head A mounted on the cylinder block B, within which is the piston C. Adjacent to one side of the cylinder bore there is formed in the cylinder head a pocket D constituting the combustion chamber. This chamber is of substantially spherical form, the upper hemi-spherical portion of it being afforded by a water-cooled wall of the cylinder head, whilst the lower portion is formed in a heat-insulated plug E secured in the cylinder head by a screwed ring F. A passage-way G is formed in the heat-insulating plug leading from the cylinder bore into the spherical combustion chamber. The axis of this passage-way lies in a diametral plane of the combustion chamber, but does not pass through the centre of the latter. Thus, during the compression stroke the air charge is forced into the combustion chamber through this passage-way and enters the latter more or less tangentially so as to be given a swirling motion about a diameter of the combustion chamber. In the upper part of the combustion chamber are mounted a fuel injector H and a heater J.

Further details of the construction are described in the prior patent referred to above, and it is not thought necessary to repeat that description herein. In Figure 1, as in the prior specifications, the axis of the injector passes through the centre of the combustion chamber. In the prior specifications, however, the injector is constructed so as to deliver a jet of fuel of which the axis is substantially in alignment with that of the injector. In the present instance, on the other hand, the jet of fuel K is directed obliquely with respect to the axis of the injector and passes to one side of the centre of the combustion chamber.

Figure 4 indicates a further modified arrangement in which the axis of the injector and that of the jet are both horizontal.

Figure 1:
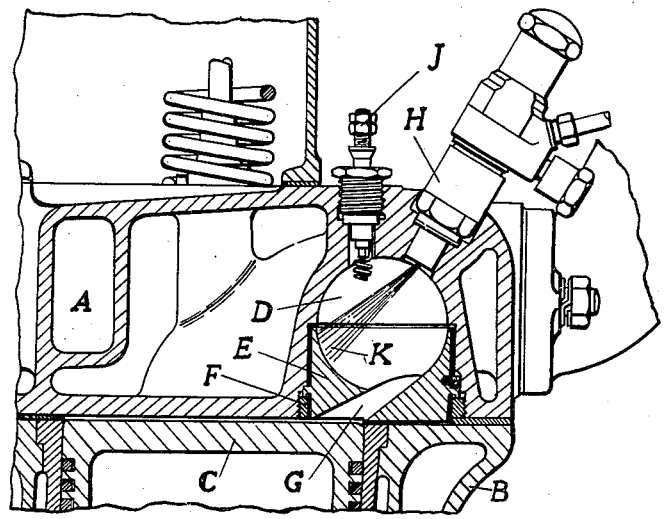
Figure 2:
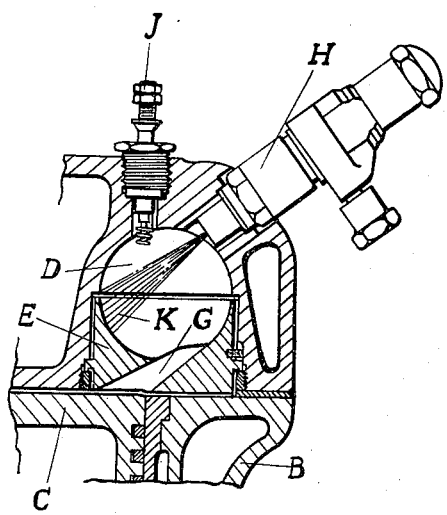
Figure 2 shows a modified arrangement in which the axis of the jet K is in alignment with the axis of the injector H and the latter is mounted in the cylinder head so that its axis passes to one side of the centre of the combustion chamber.
Figure 3:
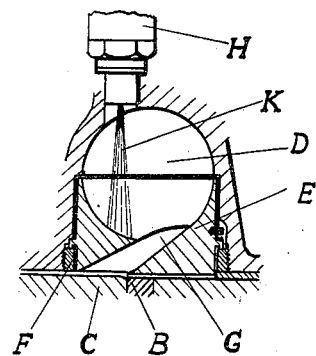
Figure 3 shows a further arrangement in which, as in Figure 2, the jet axis is in line with the injector axis, but in this arrangement the injector is arranged with its axis vertical.

In the arrangements shown in Figures 1, 2 and 3, the circumferential positioning of the injector is such that the jet is directed towards a point on the hot plug E. In Figure 4, on the other hand, the positioning is such that the jet is directed towards a point on the upper part of the wall of the combustion chamber. In this event it is preferred to line this wall with a liner member L which, as to the majority of its area, is out of contact with the water-cooled wall of the chamber and therefore affords a hot wall.

Figure 5 is a diagram illustrating the angular limits within which the axis of the jet may lie in accordance with this invention. Thus, the outer circle D represents a section of the combustion chamber by a plane of symmetry containing the axis of the jet, and the injector H is indicated at the top of the figure. If the air is circulating in the direction of the arrow M, the jet axis is inclined so as to deliver the fuel to some extent in the same direction. The upper limit of this inclination, in accordance with the invention, is indicated by the arrow P. Thus if R is the radius of the circle D representing the periphery of the combustion chamber, the arrow P is tangential to a circle of radius approximately ½ R. Moreover preferably the inclination is not less than that indicated by the arrow N, which is tangential to a circle of radius approximately ¼ R. The angular spacings corresponding to these figures are that the end of the arrow P is spaced from the injector nozzle in the direction of circulation of the air by an angle of approximately 120°, whilst the end of the arrow N is correspondingly spaced by an angle of approximately 150°.

Figure 6 is a diagrammatic plan view, in which the combustion chamber D is represented by a series of circles on the right, whilst the cylinder bore is represented by the larger circle B. The passage-way G appears within the combustion chamber and the vertical plane containing its axis is represented by the chain line Q. It will be seen that the chain line Q passes through the centre of the circle B, that is to say that the axis of the passage-way intersects the axis of the cylinder bore. Whilst this construction is convenient in practice, it is not essential that this should be so in all cases. Thus the plane of symmetry of the combustion chamber containing the axis of the passage-way and the axis of the fuel jet may be offset or inclined to a radial plane of the cylinder bore to a substantial extent. The limit of this inclination is reached when the plane is substantially tangential with respect to the cylinder bore. These limiting positions are indicated by the chain line S—T. In practice, at any rate in multi-cylinder engines, it would probably be impracticable to offset or incline the passageway to this extent, and a more normal construction is shown in Figure 7, in which the offsetting is about half that indicated by these limits, the distance between the passage-way axis and the cylinder axis being about one third of the radius of the cylinder bore. In every case the passage-way must, of course, open into the cylinder bore.

In the particular examples shown in the drawings the combustion chamber is indicated as being of spherical form, but in certain cases it will probably be found preferable to employ a combustion chamber in the form of a surface of revolution other than spherical. For example, the combustion chamber may be in the form of a double concave or a double convex lens, or alternatively it may be spheroidal, cylindrical or barrel-shaped or have the appearance of two truncated cones, whose smaller ends are in open communication about the centre of the length of the chamber which extends transversely in relation to the fuel jet axis. Figures 1 to 5 are, however, equally applicable to such shapes, as far as indicating the features of the invention is concerned.

Moreover, the passage-way has been indicated in Figure 6 as being of substantially rectangular cross-section with rounded corners. It will be appreciated that other cross-sections may be employed. Further the invention has been described with reference to an engine with its cylinder axis vertical, whereas it is, of course, equally applicable to horizontal cylinder engines. Whilst for convenience the plane of symmetry of the combustion chamber containing the axes of the jet and passage-way is normally parallel to the cylinder axis, i. e. in the case of a vertical cylinder is a vertical plane, the invention is not limited to this, but would include a construction with this plane inclined.

What I claim is:

1. An internal combustion engine of the liquid fuel injection compression ignition type, comprising a cylinder; a combustion chamber, the contour of which is substantially a surface of revolution symmetrical about a plane at right angles to its axis, communicating with said cylinder; a piston adapted to reciprocate in said cylinder, and to approach the end of said cylinder at the end of its compression stroke so that the greater part of the clearance space is comprised within the combustion chamber; means constituting at least part of the wall of the combustion chamber arranged to be kept relatively hot during running, said means comprising a member in which a passageway between the cylinder and combustion chamber is formed, the axis of said passageway lying in the plane of symmetry of the combustion chamber and spaced from the axis of said chamber so as to cause the air entering the chamber to partake of a swirling motion about the axis of the chamber, the annular body of air moving with the greatest velocity being substantially in the plane of symmetry of the chamber and being separated from both the axis and the wall thereof; a fuel injecting nozzle disposed in the wall of the combustion chamber and adapted to deliver a jet of fuel, the axis of which lies in the plane of symmetry of the combustion chamber and is directed toward a point on the part of the wall of the combustion chamber which is kept hot during running, which point is spaced from said nozzle about the chamber axis in the direction in which the air circulates by an angular spacing which is between approximately 120° and approximately 150°, whereby said jet is concentrated in the path of that portion of the air circulating within the chamber at the highest velocity, the orifice of said passageway in the combustion chamber being disposed at a point which is outside of said angular spacing and spaced from said nozzle about the chamber axis in the direction of air circulation by an angular spacing in the neighborhood of from 180°–225°.

2. An internal combustion engine of the liquid fuel injection compression ignition type, comprising a cylinder, a combustion chamber, the contour of which is substantially a surface of revolution symmetrical about a plane at right angles to its axis, communicating with said cylinder; a piston adapted to reciprocate in said cylinder, and to approach the end of said cylinder at the end of its compression stroke so that the greater part of the clearance space is comprised within the combustion chamber; means constituting at least part of the wall of the combustion chamber arranged to be kept relatively hot during running, said means comprising a heat insulated plug shaped member in which a passageway between the cylinder and combustion chamber is formed, the axis of said passageway lying in the plane of symmetry of the combustion chamber and spaced from the axis of said chamber so as to cause the air entering the chamber to partake of a swirling motion about the axis of the chamber, the annular body of air moving with the greatest velocity being substantially in the plane of symmetry of the chamber and separated from both the axis and the wall of the chamber; a fuel injecting nozzle disposed in the wall of the combustion chamber and adapted to deliver a jet of fuel, the axis of which lies in the plane of symmetry of the combustion chamber and is directed toward a point on the part of the wall of the combustion chamber constituted by said heat insulated plug shaped member, which point is spaced from said nozzle about the chamber axis in the direction in which the air circulates by an angular spacing which is between approximately 120° and approximately 150°, whereby said jet is concentrated in the path of that portion of the air circulating within the chamber at the highest velocity, the orifice of said passageway in the combustion chamber being angularly spaced from said nozzle about the chamber axis in the direction of air circulation by an angular spacing in the neighborhood of from 180° to 225°.

3. In an internal combustion engine of the liquid fuel injection compression ignition type, a combustion chamber the contour of which is approximately a surface of revolution symmetrical about a plane at right angles to its axis, into which chamber during the compression stroke of the engine the larger part of the air charge is forced; a heat-insulated plug shaped member adapted to be kept hot during running of the engine, and formed with a passageway leading into said combustion chamber, said passageway having its axis lying along a chord of the circular contour of the combustion chamber in its plane of symmetry so that the entering air is caused to rotate about the axis of the combustion chamber, the annular body of air rotating with the greatest velocity being substantially in the plane of symmetry of the chamber and spaced from both the axis and the wall of said chamber; and a fuel injecting nozzle adapted to deliver a jet of liquid fuel toward a point on the wall of said chamber which is kept hot during running, the axis of which jet lies along a chord of the circular contour of the combustion chamber in its said plane of symmetry, the arrangement being such that the passageway orifice, the rotating body of air approaching the injecting nozzle, and the chamber axis are all on the same side of the last named chord, the perpendicular distance of said chord from the chamber axis being between approximately one-quarter and approximately one-half of the radius of the combustion chamber, whereby said jet is concentrated in the path of that portion of air circulating within the chamber at the highest velocity.

HARRY RALPH RICARDO.